United States Patent
Ikeda

(10) Patent No.: US 12,074,554 B2
(45) Date of Patent: Aug. 27, 2024

(54) MOTOR CONTROL DEVICE AND MOTOR CONTROL METHOD

(71) Applicant: MITSUBA Corporation, Gunma (JP)

(72) Inventor: Takeshi Ikeda, Gunma (JP)

(73) Assignee: MITSUBA Corporation, Gunma (JP)

( * ) Notice: Subject to any disclaimer, the term of this patent is extended or adjusted under 35 U.S.C. 154(b) by 136 days.

(21) Appl. No.: 17/978,977

(22) Filed: Nov. 2, 2022

(65) Prior Publication Data

US 2023/0231499 A1 Jul. 20, 2023

(30) Foreign Application Priority Data

Jan. 18, 2022 (JP) .................................. 2022-005670

(51) Int. Cl.
*H02P 6/16* (2016.01)

(52) U.S. Cl.
CPC ...................................... *H02P 6/16* (2013.01)

(58) Field of Classification Search
CPC .... H02P 6/16; H02P 6/15; H02P 21/05; H02P 21/14; H02P 21/18; H02P 21/22
USPC .................. 318/400.38, 400.37, 400.01, 700
See application file for complete search history.

(56) References Cited

U.S. PATENT DOCUMENTS 6,081,087 A * 6/2000 Iijima .................. G01D 5/2449
318/400.32

FOREIGN PATENT DOCUMENTS

JP 2017121105 7/2017

* cited by examiner

*Primary Examiner* — David Luo
(74) *Attorney, Agent, or Firm* — JCIPRNET

(57) ABSTRACT

Provided is a motor control device in which, with a position detection signal corresponding to a phase with a first reference Hall edge forming a first Hall stage, which is a minimum counter value, defined as a first reference position detection signal, and with a position detection signal corresponding to a phase with a second reference Hall edge forming a second Hall stage, which is an intermediate value, defined as a second reference position detection signal, for a first detection error with the first reference position detection signal used as a reference and a second detection error with the second reference position detection signal used as a reference, a correction coefficient calculated from one of the first and second detection errors is selected and set based on whether the first and second detection errors include a negative value.

11 Claims, 5 Drawing Sheets

MOTOR CONTROL DEVICE AND MOTOR CONTROL METHOD

CROSS-REFERENCE TO RELATED APPLICATION

This application claims the priority benefit of Japan application serial no. 2022-005670, filed on Jan. 18, 2022. The entirety of the above-mentioned patent application is hereby incorporated by reference herein and made a part of this specification.

BACKGROUND

Technical Field

The disclosure relates to a motor control device and a motor control method.

Description of Related Art

A brushless motor includes a stator having three-phase coils and a rotor having field permanent magnets. A sensor magnet that rotates together with the rotor is attached to the rotation shaft of the rotor. The sensor magnet is alternately magnetized with S poles and N poles in the rotation direction. In the vicinity of the sensor magnet, three Hall sensors for detecting the rotation position are attached at predetermined intervals in the rotation direction so that switching of the magnetic poles of the sensor magnet may be detected.

In a motor control device that controls the drive of a brushless motor, the switching position (Hall edge) of the three Hall sensors is used as a reference, and the energization pattern corresponding to the six Hall stages represented by a combination of potentials of position detection signals, which are outputs of the three Hall sensors, is output to the inverter circuit that drives the brushless motor to rotate the brushless motor.

Here, due to variations in the magnetization of sensor magnets in the brushless motor, variations in mounting positions of the hall sensors and the like, the electrical angle spacing between the two Hall edges that form each of the six Hall stages 1 to 6 may not match the electrical angle spacing designed for the Hall stage. In such a case, if the output of the drive signal is switched for each Hall edge, the movement of the brushless motor may be affected, and vibration and abnormal noise may occur.

Therefore, a motor control device has been proposed that has a configuration in which a position detection signal is corrected for each Hall edge indicating switching of the Hall stage, and an energization pattern is switched based on the corrected position detection signal (for example, see Patent Literature 1).

RELATED ART

Patent Literature

[Patent Literature 1] Japanese Patent Application Laid-Open No. 2017-121105

The motor control device described above smooths the motion of the brushless motor by using the timing delayed from the timing at which the Hall edge position detection signal is detected as the switching timing of the energization pattern.

However, in the motor control device described above, depending on the mounting positions of the three Hall sensors, the correction amount of the position detection signal may become a negative value (that is, the delay time for timing correction may become negative), and in some cases, the switching timing of the energization pattern cannot be controlled.

SUMMARY

Technical Problem

The disclosure has been made in view of the circumstances described above, and the disclosure provides a motor control device and a control method for the motor control device that may accurately suppress the occurrence of vibration and abnormal noise of a brushless motor.

Solution to Problem

A motor control device according to an embodiment of the disclosure controls rotation of a rotor by controlling energization of three-phase coils of a brushless motor. The motor control device includes: multiple switching elements disposed to be able to switch currents flowing through the coils; multiple sensors provided corresponding to each of the coils for detecting a rotation position of the rotor; and a control part that outputs a drive signal for switching the switching elements based on position detection signals that are outputs of the sensors. The control part includes: a gate control voltage output part that outputs a drive signal for switching the switching elements based on a corrected Hall edge forming each of six Hall stages represented by a combination of potentials of the position detection signals that are the outputs of the sensors; a counter value acquisition part that acquires a counter value, which is a time of the Hall stage represented by a time between two hall edges that form each of the Hall stages, from the position detection signal; and a switching control part that causes the gate control voltage output part to output the drive signal based on each of the Hall edges corrected by a delay time, with a value obtained by calculating each counter value of a previous Hall stage and a preset correction coefficient as the delay time of each Hall edge this time. With a Hall edge whose corresponding Hall stage has a smaller counter value by widening the Hall edge in a rotation direction of the brushless motor defined as a first reference Hall edge, of two Hall edges that form a first Hall stage, which is a minimum counter value among six Hall stage counter values acquired by the counter value acquisition part, and with the position detection signal corresponding to a phase with the first reference Hall edge defined as a first reference position detection signal, and with a Hall edge whose corresponding Hall stage has a smaller counter value by widening the Hall edge in the rotation direction of the brushless motor defined as a second reference Hall edge, of two Hall edges that form a second Hall stage, which is an intermediate value between a maximum counter value and the minimum counter value among the six Hall stage counter values acquired by the counter value acquisition part, and with the position detection signal corresponding to a phase with the second reference Hall edge defined as a second reference position detection signal, for a first detection error when the first reference position detection signal is used as a reference and a second detection error when the second reference position detection signal is used as a reference, among detection errors, which are differences between an average value of counter values for three Hall stages consecutive in the rotation direction of the brushless motor and the counter values of the respective Hall stages, the correction coefficient calculated from one of the first detection error and the second detection error is selected and set based on whether the first detection error and the second detection error include a negative value.

A motor control method according to an embodiment of the disclosure is for a motor control device that controls rotation of a rotor by controlling energization of three-phase coils of a brushless motor. The motor control device includes: multiple switching elements disposed to be able to switch currents flowing through the coils; multiple sensors provided corresponding to each of the coils for detecting a rotation position of the rotor; and a control part that outputs a drive signal for switching the switching elements based on position detection signals that are outputs of the sensors. The control part includes a gate control voltage output part, a counter value acquisition part, a switching control part, a reference phase selection part, an average value calculation part, a detection error calculation part, a correction coefficient calculation part, and a memory control part. The motor control method includes: a gate control voltage output step in which the gate control voltage output part outputs a drive signal for switching the switching elements based on a corrected Hall edge forming each of six Hall stages represented by a combination of potentials of the position detection signals that are the outputs of the sensors; a counter value acquisition step in which the counter value acquisition part acquires a counter value, which is a time of the Hall stage represented by a time between two hall edges that form each of the Hall stages, from the position detection signal; a switching control step in which the switching control part causes the gate control voltage output part to output the drive signal based on each of the Hall edges corrected by a delay time, with a value obtained by calculating each counter value of a previous Hall stage and a preset correction coefficient as the delay time of each Hall edge this time; a reference phase selection step in which the reference phase selection part defines a Hall edge whose corresponding Hall stage has a smaller counter value by widening the Hall edge in a rotation direction of the brushless motor as a first reference Hall edge, of two Hall edges that form a first Hall stage, which is a minimum counter value among six Hall stage counter values acquired by the counter value acquisition part, defines the position detection signal corresponding to a phase with the first reference Hall edge defined as a first reference position detection signal, defines a Hall edge whose corresponding Hall stage has a smaller counter value by widening the Hall edge in the rotation direction of the brushless motor defined as a second reference Hall edge, of two Hall edges that form a second Hall stage, which is an intermediate value between a maximum counter value and the minimum counter value among the six Hall stage counter values acquired by the counter value acquisition part, and defines the position detection signal corresponding to a phase with the second reference Hall edge as a second reference position detection signal; an average value calculation step in which the average value calculation part calculates an average value of counter values for three Hall stages consecutive in the rotation direction of the brushless motor; a detection error calculation step in which the detection error calculation part calculates a first detection error when the first reference position detection signal is used as a reference and a second detection error when the second reference position detection signal is used as a reference, among detection errors, which are differences between the average value and the counter values of the respective Hall stages; a correction coefficient calculation step in which the correction coefficient calculation part calculates a first correction coefficient by dividing the first detection error by the average value and a second correction coefficient by dividing the second detection error by the average value; and a memory control step in which the memory control part causes to store the correction coefficient calculated from one of the first detection error and the second detection error as the correction coefficient based on whether the calculated first detection error and second detection error include a negative value.

Effects

According to the disclosure, it is possible to accurately suppress the occurrence of vibration and abnormal noise in a brushless motor.

DESCRIPTION OF EMBODIMENTS

Embodiment

A motor control device and a motor control method according to an embodiment of the disclosure will be described below with reference to the drawings.

Figure 1:
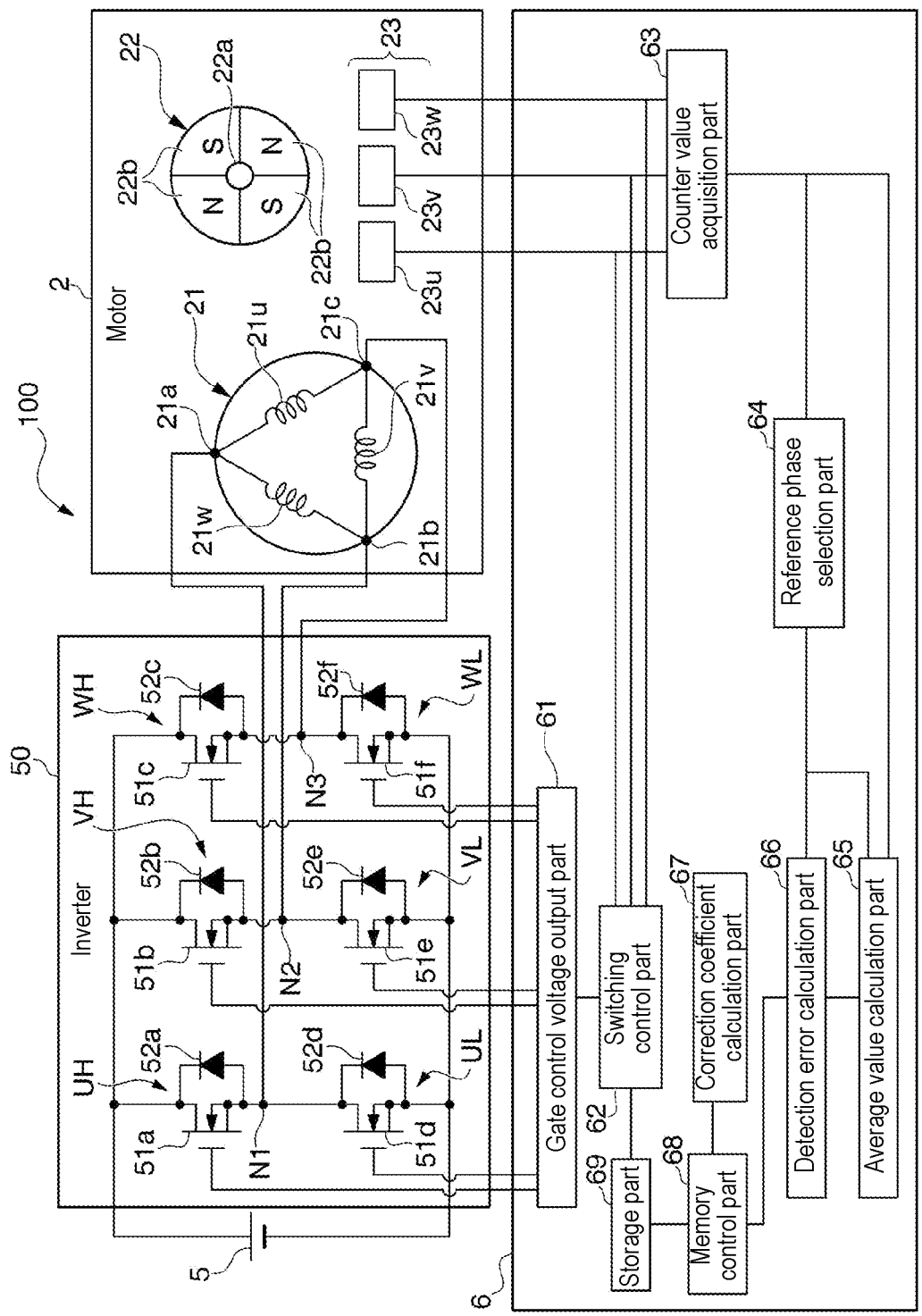
FIG. 1 is a diagram showing an example of a motor device according to the embodiment.

FIG. 1 is a diagram showing an example of a motor device 100 according to the embodiment.

As shown in FIG. 1, the motor device 100 includes a motor 2, a rotation shaft sensor 23, a control part 6, and an inverter 50.

The motor device 100 according to this embodiment is used, for example, as a wiper device for wiping the window glass of a vehicle.

Configuration Example of the Inverter

The inverter 50 outputs an output signal for driving the motor 2 to rotate based on the drive signal generated by a drive signal generation part. That is, the inverter 50 drives switching elements (51a to 51f) based on the drive signal generated by the drive signal generation part, and applies an applied voltage based on the energization waveform to the three-phase armature coils (21u, 21v, and 21w).

The inverter 50 generates the applied voltage from a DC power supplied from a battery 5.

The inverter 50 includes six switching elements 51a to 51f and diodes 52a to 52f, which are three-phase bridge-connected.

The switching elements 51a to 51f are, for example, N-channel metal oxide semiconductor field effect transistors (MOSFETs) and configure a three-phase bridge circuit.

The switching element 51a and the switching element 51d are connected in series between the positive terminal and the negative terminal of the battery 5 to form a U-phase bridge circuit. The switching element 51a has a drain terminal connected to the positive terminal of the battery 5, a source terminal connected to the node N1, and a gate terminal connected to the signal line of the U-phase upper drive signal. Further, the switching element 51d has a drain terminal connected to the node N1, a source terminal connected to the negative terminal of the battery 5, and a gate terminal connected to the signal line of the U-phase lower drive signal. Further, the node N1 is connected to the connection point 21a of the motor 2.

The switching element 51b and the switching element 51e are connected in series between the positive terminal and the negative terminal of the battery 5 to form a V-phase bridge circuit. The switching element 51b has a drain terminal connected to the positive terminal of the battery 5, a source terminal connected to the node N2, and a gate terminal connected to the signal line of the V-phase upper drive signal. Further, the switching element 51e has a drain terminal connected to the node N2, a source terminal connected to the negative terminal of the battery 5, and a gate terminal connected to the signal line of the V-phase lower drive signal. Further, the node N2 is connected to the connection point 21b of the motor 2.

The switching element 51c and the switching element 51f are connected in series between the positive terminal and the negative terminal of the battery 5 to form a W-phase bridge circuit. The switching element 51c has a drain terminal connected to the positive terminal of the battery 5, a source terminal connected to the node N3, and a gate terminal connected to the signal line of the W-phase upper drive signal. Further, the switching element 51f has a drain terminal connected to the node N3, a source terminal connected to the negative terminal of the battery 5, and a gate terminal connected to the signal line of the W-phase lower drive signal. Further, the node N3 is connected to the connection point 21c of the motor 2.

Further, the diodes 52a to 52f are all so-called freewheeling diodes.

In the following description, the switching elements 51a, 51b, 51c, 51d, 51e, and 51f are also referred to as switching elements UH, VH, WH, UL, VL, and WL.

Configuration Example of the Motor

The motor 2 is, for example, a three-phase four-pole brushless motor. The motor 2 is driven to rotate by an output signal output from the inverter 50 based on a drive signal to be described later.

Further, the motor 2 includes a stator 21 and a rotor 22.

The stator 21 is fixed to the inner periphery of the case of the motor 2. The stator 21 includes three-phase armature coils (21u, 21v, and 21w). The stator 21 is wound with the armature coils (21u, 21v, and 21w). For example, the three-phase armature coils (21u, 21v, and 21w) are connected by delta connection.

In the delta connection, the armature coils 21u and 21w are connected by the connection point 21a; the armature coils 21v and 21w are connected by the connection point 21b; and the armature coils 21u and 21v are connected by the connection point 21c.

The rotor 22 is provided inside the stator 21. The rotor 22, for example, includes a rotor shaft 22a and a sensor magnet 22b attached to the rotor shaft 22a. Multiple bearings (not shown) are provided in the case of the motor 2, and the rotor shaft 22a is rotatably supported by the multiple bearings.

The rotation shaft sensor 23 detects a signal according to the rotation of the rotor 22. The rotation shaft sensor 23 includes, for example, three Hall sensors (23u, 23v, and 23w). These three Hall sensors (23u, 23v, and 23w) output pulse signals having a phase difference of about 120 degrees to the control part 6 when the rotor 22 rotates. That is, the rotation shaft sensor 23 generates a pulse signal based on the change in the magnetic poles of the four-pole sensor magnet 22b disposed on the rotor shaft 22a as the rotor 22 rotates, and outputs the pulse signal to the control part 6. Each Hall sensor detects a position shifted by an electrical angle of about 120 degrees.

Configuration Example of the Control Part (Motor Control Device)

The control part 6 is, for example, a processor including a central processing unit (CPU) and the like, and controls the motor device 100 as a whole. The control part 6 performs pulse width modulation (PWM) control, sets the duty ratio according to the target rotation output of the rotor 22 (for example, the target rotation speed TRPM), and outputs a drive signal to the inverter 50 according to the set duty ratio. In addition, the control part 6 controls the drive of the motor 2 through the inverter 50 by, for example, rectangular wave energization.

In addition, the control part 6 is also called a motor control device.

The control part 6 includes a gate control voltage output part 61, a switching control part 62, a counter value acquisition part 63, a reference phase selection part 64, an average value calculation part 65, a detection error calculation part 66, a correction coefficient calculation part 67, a memory control part 68, and a storage part 69.

The gate control voltage output part 61 outputs a PWM signal (drive signal) for switching the switching elements UH, VH, WH, UL, VL, and WL based on the corrected Hall edges that form each of the six Hall stages represented by the combination of the potentials of the position detection signals Hu, Hv, and Hw output from the Hall sensors 23u, 23v, and 23w.

The counter value acquisition part 63 acquires the counter value, which is the time of the Hall stage represented by the time between two Hall edges forming each of the Hall stages 1 to 6, from the position detection signals Hu, Hv, Hw input from the Hall sensors 23u, 23v, and 23w.

The switching control part 62 recognizes the Hall stage based on the position detection signals Hu, Hv, and Hw input from the Hall sensors 23u, 23v, and 23w, and reads out the energization pattern corresponding to the Hall stage stored in the storage part 69. With the value obtained by multiplying each counter value of the previous Hall stage (360 electrical degrees before) by a preset correction coefficient as the delay time of each Hall edge this time, the switching control part 62 generates a PWM command signal having a period of 60 electrical degrees based on each of the Hall edges corrected by the delay time from the energization pattern, and causes the gate control voltage output part 61 to output the PWM signal having a period of 60 electrical degrees.

In this way, the switching elements UH, VH, WH, UL, VL, and WL are driven by PWM control and intermittently turned on and off during periods corresponding to the respective energization patterns.

Correction Coefficient Setting

The correction coefficient is set as follows before shipment of the motor control device (for example, an adjustment process or a shipment inspection process after product assembly).

Figure 2:
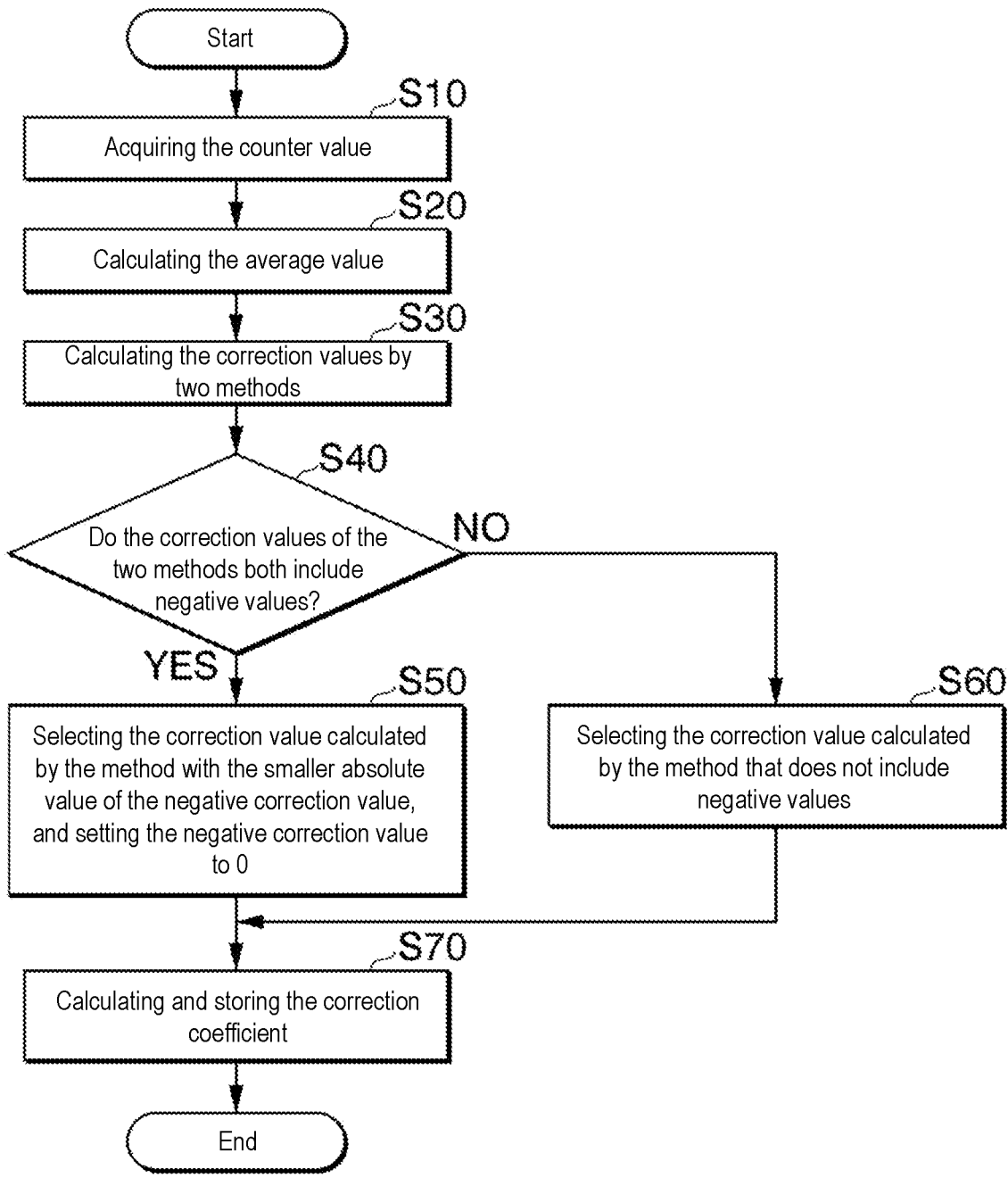
FIG. 2 is a diagram showing an example of a correction coefficient setting procedure according to the embodiment.

FIG. 2 is a diagram showing an example of a correction coefficient setting procedure according to the embodiment.

(Step S10) The motor 2 is driven to rotate by the control part 6. In this state, the counter value acquisition part 63 acquires the time interval (that is, the counter value) between the two Hall edges forming each of the Hall stages 1 to 6. The reference phase selection part 64 selects a reference phase, which serves as a detection reference for detection errors, from among the U phase, V phase, and W phase based on the counter value for each Hall stage acquired by the counter value acquisition part 63. The reference phase selection part 64 of this embodiment selects two types of reference phases, including a first reference phase and a second reference phase.

The first reference phase is a phase in which a first reference Hall edge exists, with the Hall edge whose corresponding Hall stage has the smaller counter value by widening the Hall edge in the rotation direction of the brushless motor defined as the first reference Hall edge, of the two Hall edges that form the first Hall stage, which is the minimum counter value among the six Hall stage counter values acquired by the counter value acquisition part.

The second reference phase is a phase in which a second reference Hall edge exists, with the Hall edge whose corresponding Hall stage has the smaller counter value by widening the Hall edge in the rotation direction of the brushless motor defined as the second reference Hall edge, of the two Hall edges that form the second Hall stage, which is the intermediate value between the maximum and minimum counter values of the six Hall stage counter values acquired by the counter value acquisition part. In addition, the "intermediate value" herein is not limited to an exactly intermediate value between the maximum counter value and the minimum counter value, but simply refers to a value less than the maximum counter value and greater than the minimum counter value.

The first reference phase and the second reference phase will be described more specifically with reference to FIG. 3.

Figure 3:
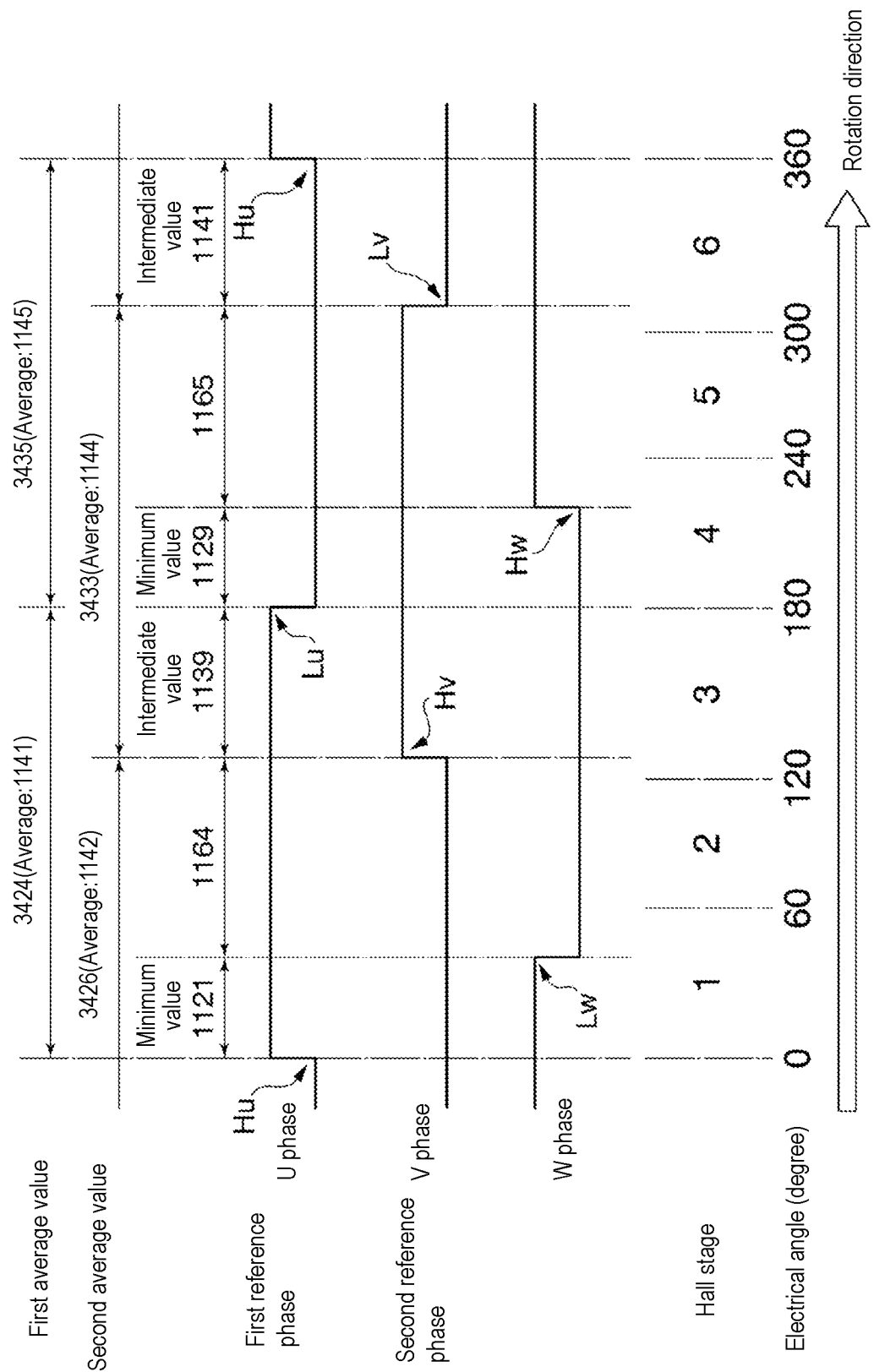
FIG. 3 is a diagram showing an example of counter values for each Hall stage according to the embodiment.

FIG. 3 is a diagram showing an example of counter values for each Hall stage according to the embodiment. Here, an electrical angle of 0 to 60 degrees is defined as a Hall stage 1; an electrical angle of 60 to 120 degrees is defined as a Hall stage 2; and similarly, an electrical angle of 300 to 360 degrees is defined as a Hall stage 6.

In the example shown in FIG. 3, the counter value of the Hall stage 1 is 1121; the counter value of the Hall stage 2 is 1164; the counter value of the Hall stage 3 is 1139; the counter value of the Hall stage 4 is 1129; the counter value of the Hall stage 5 is 1165; and the counter value of the Hall stage 6 is 1141.

In this example, the above-described first Hall stage (that is, the Hall stage having the minimum counter value among the counter values of the six Hall stages obtained by the counter value acquisition part) is the Hall stage 1.

In addition, the counter value may have a similar tendency for every 180 electrical degrees. For example, when the counter value of the Hall stage 1 is relatively small, the counter value of the Hall stage 4 whose electrical angle is shifted by 180 degrees also tends to be relatively small. In this case, the Hall stage that minimizes the counter value may be selected for every 180 electrical degrees. For example, the Hall stage 1 may be the first Hall stage for the electrical angles of 0 to 180 degrees, and the Hall stage 4 may be the first Hall stage for the electrical angles of 180 to 360 degrees.

That is, in this embodiment, "the Hall stage with the minimum counter value" among the six Hall stages may mean one Hall stage with the minimum counter value in the electrical angle range of 0 to 360 degrees, and may mean both the Hall stage with the minimum counter value in the electrical angle range of 0 to 180 degrees and the Hall stage with the minimum counter value in the electrical angle range of 180 to 360 degrees.

As described above, the first reference phase is the phase with the first reference Hall edge. The first reference Hall edge is the hall edge whose corresponding Hall stage has the smaller counter value by widening the Hall edge in the rotation direction of the brushless motor, of the two Hall edges that form the first Hall stage.

In an example shown in FIG. 3, of the two Hall edges (the rising position of the position detection signal Hu and the falling position of the position detection signal Lw) that form the first Hall stage (Hall stage 1), the counter value of the Hall stage 1 becomes smaller than "1121" by widening the rising position of the position detection signal Hu in the rotation direction of the brushless motor. In addition, by widening the falling position of the position detection signal Lw in the rotation direction of the brushless motor, the counter value of the Hall stage 1 becomes larger than "1121." In this case, the rising position of the position detection signal Hu is the first reference Hall edge, and the first reference phase is the phase in which the position detection signal Hu exists, that is, the U phase.

The reference phase selection part 64 sets the Hall edge whose corresponding Hall stage has the smaller counter value by widening the Hall edge in the rotation direction of the brushless motor as the first reference Hall edge, of the two Hall edges that form the first Hall stage, which is the minimum counter value among the six Hall stage counter values acquired by the counter value acquisition part, and sets the position detection signal corresponding to the phase with the first reference Hall edge as the first reference position detection signal.

That is, in this example, the reference phase selection part 64 selects the U phase as the first reference phase and the position detection signal Hu as the first reference position detection signal.

In addition, the reference phase selection part 64 selects the U phase as the first reference phase and the position detection signal Lu as the first reference position detection signal in the same manner as described above also when the electrical angle is 180 to 360 degrees.

Next, the second reference phase will be described.

In the example shown in FIG. 3, in the electrical angle range of 0 to 180 degrees, the Hall stage 1 (counter value is 1121) has the minimum counter value, and the Hall stage 2 (counter value is 1164) has the maximum counter value. That is, among the Hall stages 1 to 3, the Hall stage 3 (counter value is 1139) has an intermediate counter value.

Further, in the electrical angle range of 180 to 360 degrees, the Hall stage 4 (counter value is 1129) has the minimum counter value, and the Hall stage 5 (counter value is 1165) has the maximum counter value. That is, among the Hall stages 4 to 6, the Hall stage 6 (counter value is 1141) has an intermediate counter value.

In this case, the second Hall stage (that is, the Hall stage that is the intermediate value between the maximum counter value and the minimum counter value among the counter values of the six Hall stages acquired by the counter value acquisition part) is Hall stage 3 in the electrical angle range of 0 to 180 degrees, and is Hall stage 6 in the electrical angle range of 180 to 360 degrees.

As described above, the second reference phase is the phase with the second reference Hall edge. The second reference Hall edge is the hall edge whose corresponding Hall stage has the smaller counter value by widening the Hall edge in the rotation direction of the brushless motor, of the two Hall edges that form the second Hall stage.

In an example shown in FIG. 3, of the two Hall edges (the rising position of the position detection signal Hv and the falling position of the position detection signal Lu) that form the second Hall stage (Hall stage 3) in the electrical angle range of 0 to 180 degrees, the counter value of the Hall stage 3 becomes smaller than "1139" by widening the rising position of the position detection signal Hv in the rotation direction of the brushless motor. In addition, by widening the falling position of the position detection signal Lu in the rotation direction of the brushless motor, the counter value of the Hall stage 3 becomes larger than "1139." In this case, the rising position of the position detection signal Hv is the second reference Hall edge, and the second reference phase is the phase in which the position detection signal Hv exists, that is, the V phase.

Further, of the two Hall edges (the falling position of the position detection signal Lv and the rising position of the position detection signal Hu) that form the second Hall stage (Hall stage 6) in the electrical angle range of 180 to 360 degrees, the counter value of the Hall stage 6 becomes smaller than "1141" by widening the falling position of the position detection signal Lv in the rotation direction of the brushless motor. In addition, by widening the rising position of the position detection signal Hu in the rotation direction of the brushless motor, the counter value of the Hall stage 6 becomes larger than "1141." In this case, the falling position of the position detection signal Lv is the second reference Hall edge, and the second reference phase is the phase in which the position detection signal Lv exists, that is, the V phase.

The reference phase selection part 64 sets the Hall edge whose corresponding Hall stage has the smaller counter value by widening the Hall edge in the rotation direction of the brushless motor as the second reference Hall edge, of the two Hall edges that form the second Hall stage, which is the intermediate value between the maximum counter value and the minimum counter value among the six Hall stage counter values acquired by the counter value acquisition part, and sets the position detection signal corresponding to the phase with the second reference Hall edge as the second reference position detection signal.

That is, in this example, the reference phase selection part 64 selects the V phase as the second reference phase and the position detection signal Hv as the second reference position detection signal.

With reference back to FIG. 2, the description of the correction coefficient setting procedure is continued.

(Step S20) The average value calculation part 65 calculates the average value of the counter values for three consecutive Hall stages in the rotation direction of the brushless motor.

In the example shown in FIG. 3, the reference phase selection part 64 selects the U phase as the first reference phase and the position detection signal Hu as the first reference position detection signal. In this case, the average value calculation part 65 calculates the average value of the counter values with the Hall stages 1 to 3 from the rising position of the position detection signal Hu (position of 0 electrical degrees) to the falling position of the position detection signal Lu (position of 180 electrical degrees) as the calculation target section.

More specifically, the average value calculation part 65 obtains a sum value 3424 by adding the counter value 1121 of the Hall stage 1, the counter value 1164 of the Hall stage 2, and the counter value 1139 of the Hall stage 3. The average value calculation part 65 obtains a first average value 1141 by dividing the sum value 3424 by the number of the Hall stages (that is, 3).

Similarly for the Hall stages 4 to 6, the average value calculation part 65 obtains a sum value 3435 by adding the counter value 1129 of the Hall stage 4, the counter value 1165 of the Hall stage 5, and the counter value 1141 of the Hall stage 6. The average value calculation part 65 obtains a first average value 1145 by dividing the sum value 3435 by the number of the Hall stages (that is, 3).

Further, the average value calculation part 65 also calculates the average value of the counter values for the second reference phase (V phase) in the same manner as for the first reference phase (U phase).

In the example shown in FIG. 3, the reference phase selection part 64 selects the V phase as the second reference phase and the position detection signal Hv as the second reference position detection signal. In this case, the average value calculation part 65 calculates the average value of the counter values with the Hall stages 3 to 5 from the rising position of the position detection signal Hv (position of 120 electrical degrees) to the falling position of the position detection signal Lv (position of 300 electrical degrees) as the calculation target section.

More specifically, the average value calculation part 65 obtains a sum value 3433 by adding the counter value 1139 of the Hall stage 3, the counter value 1129 of the Hall stage 4, and the counter value 1165 of the Hall stage 5. The average value calculation part 65 obtains a second average value 1144 by dividing the sum value 3433 by the number of the Hall stages (that is, 3).

Similarly for the Hall stages 6 to 2, the average value calculation part 65 obtains a sum value 3426 by adding the counter value 1141 of the Hall stage 6, the counter value 1121 of the Hall stage 1, and the counter value 1164 of the Hall stage 2. The average value calculation part 65 obtains a second average value 1142 by dividing the sum value 3426 by the number of the Hall stages (that is, 3).

(Step S30) With reference back to FIG. 2, the detection error calculation part 66 calculates a first detection error with the first reference position detection signal as a reference and a second detection error with the second reference position detection signal as a reference, among the detection errors, which are the differences between the average value and the counter value of each Hall stage.

Figure 4:
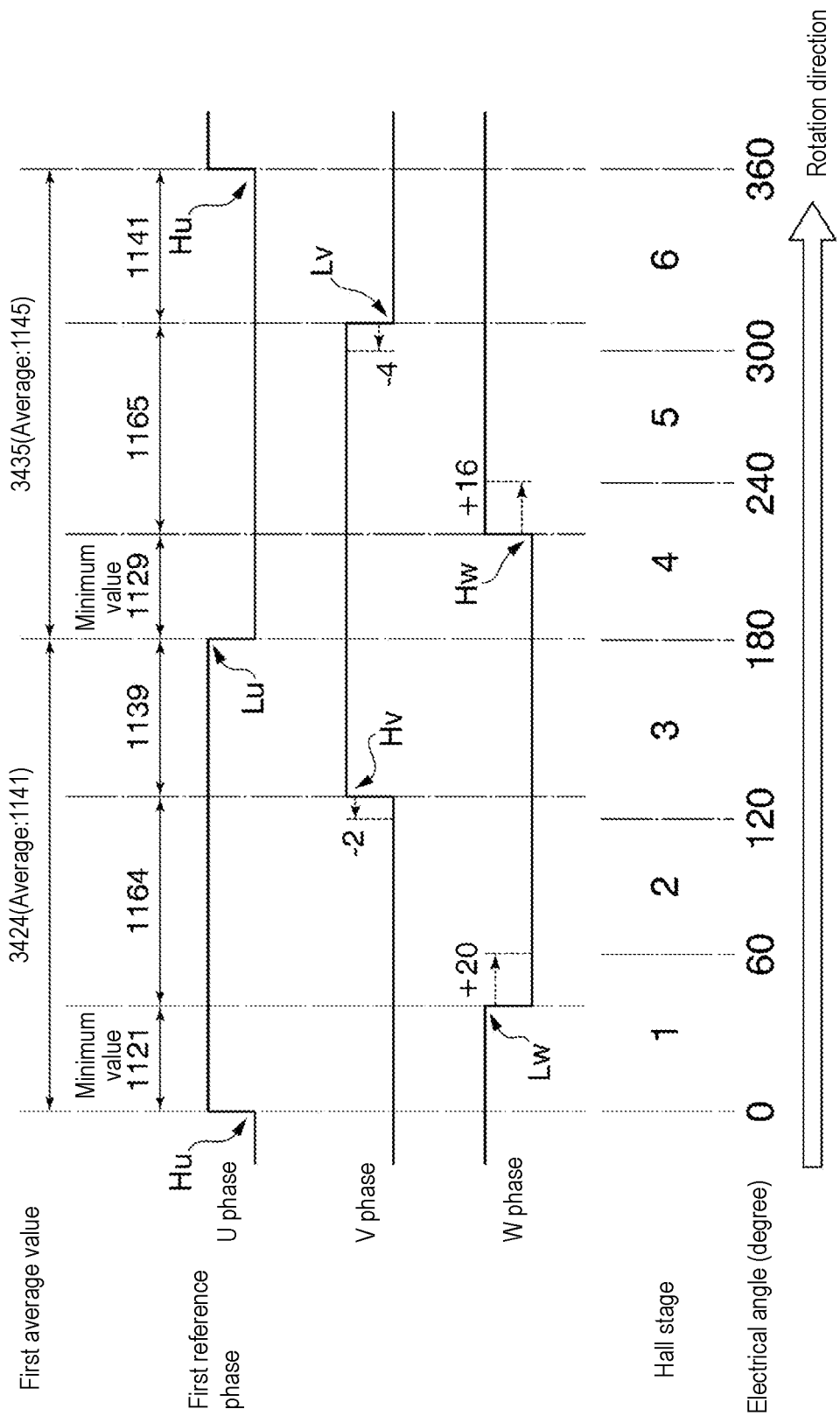
FIG. 4 is a diagram showing an example of calculation results of a first detection error using the first average value according to the embodiment.
Figure 5:
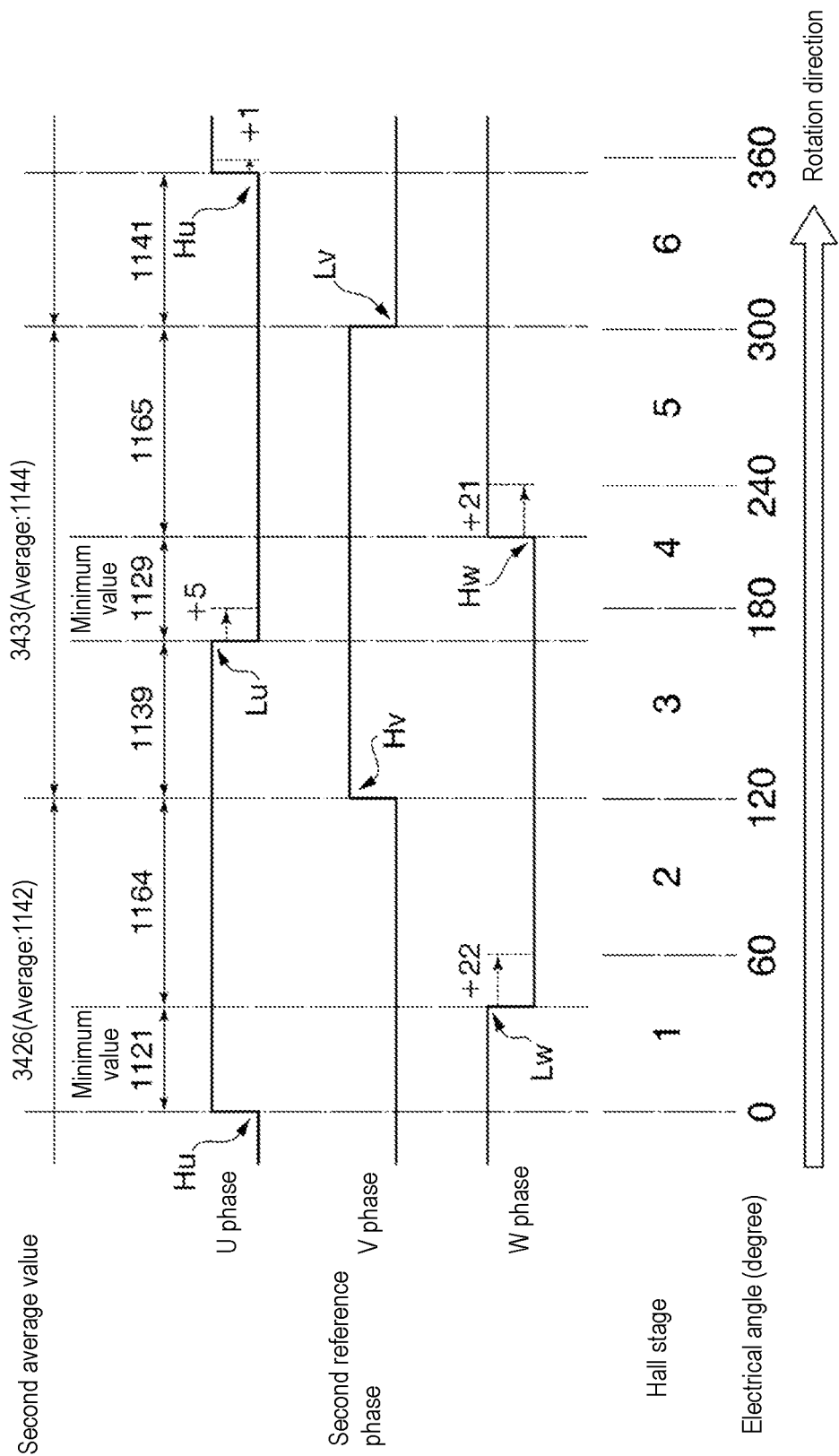
FIG. 5 is a diagram showing an example of calculation results of a second detection error using the second average value according to the embodiment.

FIG. 4 shows a specific example in which the detection error calculation part 66 calculates the first detection error using the first average value, and FIG. 5 shows a specific example in which the detection error calculation part 66 calculates the second detection error using the second average value, and the description will be made with reference to FIG. 4 and FIG. 5.

FIG. 4 is a diagram showing an example of calculation results of a first detection error using the first average value according to the embodiment.

Specifically, in the range of the Hall stages 1 to 3, the detection error calculation part 66 calculates the difference +20 (plus twenty) between the first average value 1141 and the counter value 1121 of the Hall stage 1 as the first detection error of the switching position (that is, the falling position of the position detection signal Lw) between the Hall stage 1 and the Hall stage 2. The detection error calculation part 66 calculates the difference −2 (minus two) between the first average value 1141 and the counter value 1139 of the Hall stage 3 as the first detection error of the switching position (that is, the rising position of the position detection signal Hv) between the Hall stage 2 and the Hall stage 3.

Further, in the range of the Hall stages 4 to 6, the detection error calculation part 66 calculates the difference +16 between the first average value 1145 and the counter value 1129 of the Hall stage 4 as the first detection error of the switching position (that is, the rising position of the position detection signal Hw) between the Hall stage 4 and the Hall stage 5. The detection error calculation part 66 calculates the difference −4 between the first average value 1145 and the counter value 1141 of the Hall stage 6 as the first detection error of the switching position (that is, the falling position of the position detection signal Lv) between the Hall stage 5 and the Hall stage 6.

FIG. 5 is a diagram showing an example of calculation results of a second detection error using the second average value according to the embodiment.

Specifically, in the range of the Hall stages 3 to 5, the detection error calculation part 66 calculates the difference +5 between the second average value 1144 and the counter value 1139 of the Hall stage 3 as the second detection error of the switching position (that is, the falling position of the position detection signal Lu) between the Hall stage 3 and the Hall stage 4. The detection error calculation part 66 calculates the difference +21 between the second average value 1144 and the counter value 1165 of the Hall stage 5 as the second detection error of the switching position (that is, the rising position of the position detection signal Hw) between the Hall stage 4 and the Hall stage 5.

Further, in the range of the Hall stages 6 to 2, the detection error calculation part 66 calculates the difference +1 between the second average value 1142 and the counter value 1141 of the Hall stage 6 as the second detection error of the switching position (that is, the rising position of the position detection signal Hu) between the Hall stage 6 and the Hall stage 1. The detection error calculation part 66 calculates the difference +22 between the second average value 1142 and the counter value 1164 of the Hall stage 2 as the second detection error of the switching position (that is, the falling position of the position detection signal Lw) between the Hall stage 1 and the Hall stage 2.

(Step S40) With reference back to FIG. 2, the memory control part 68 determines whether the calculated first detection error and second detection error include negative values. When the memory control part 68 determines that both the first detection error and the second detection error include negative values (step S40: YES), the process proceeds to step S50. When the memory control part 68 determines that one of the first detection error and the second detection error does not include a negative value (step S40: NO), the process proceeds to step S60.

Here, in the example shown in FIGS. 3 to 5, the first detection error is +20 for the falling position of the position detection signal Lw; the first detection error is −2 for the rising position of the position detection signal Hv; the first detection error is +16 for the rising position of the position detection signal Hw; and the first detection error is −4 for the falling position of the position detection signal Lv. That is, the first detection error includes negative values.

Further, the second detection error is +5 for the falling position of the position detection signal Lu; the second detection error is +21 for the rising position of the position detection signal Hw; the second detection error is +1 for the rising position of the position detection signal Hu; and the second detection error is +22 for the falling position of the position detection signal Lw. That is, the second detection error does not include any negative values.

In the case of this example, the memory control part 68 determines that one of the first detection error and the second detection error does not include a negative value, and proceeds the process to step S60.

In addition, there may be a case in which both the first detection error and the second detection error include negative values depending on the magnetization variations of the sensor magnet, the mounting position variations of the Hall sensor, and the like. In this case, the memory control part 68 proceeds the process to step S50.

(Step S50) With reference back to FIG. 2, the memory control part 68 selects, as a correction value, the first detection error or the second detection error that has the smaller absolute value of the negative value. For example, if the first detection error includes −1 (minus one) and the second detection error includes −7 (minus seven), the absolute value of the negative value of the first detection error is smaller. In this case, the memory control part 68 selects the first detection error as the correction value.

The memory control part 68 replaces negative values included in the detection error with 0 (zero). For example, −1 (minus one) included in the first detection error is replaced with 0 (zero).

The memory control part 68 provides the correction value after being replaced with 0 (zero) to the correction coefficient calculation part 67.

(Step S60) In addition, when one of the first detection error and the second detection error does not include a negative value, the memory control part 68 selects, as the correction value, the first detection error or the second detection error that does not include a negative value. For example, if the first detection error includes a negative value and the second detection error does not include a negative value, the memory control part 68 selects the second detection error as the correction value.

The memory control part 68 provides the selected correction value to the correction coefficient calculation part 67.

(Step S70) The correction coefficient calculation part 67 calculates a correction coefficient by dividing the correction value selected by the memory control part 68 by the average value described above.

Specifically, when the first detection error is provided as the correction value, as shown in FIG. 4, the correction coefficient calculation part 67 calculates a value obtained by dividing the first detection error +20 of the falling position of the position detection signal Lw by the first average value 1141, a value obtained by dividing the first detection error +16 of the rising position of the position detection signal Hv by the first average value 1145, and a value obtained by dividing the first detection error −4 of the falling position of the position detection signal Lv by the first average value 1145 as the first correction coefficient, respectively.

Further, when the second detection error is provided as the correction value, as shown in FIG. 5, the correction coefficient calculation part 67 calculates a value obtained by dividing the second detection error +5 of the falling position of the position detection signal Lu by the second average value 1144, a value obtained by dividing the second detection error +21 of the rising position of the position detection signal Hw by the second average value 1144, a value obtained by dividing the second detection error +1 of the rising position of the position detection signal Hu by the second average value 1142, and a value obtained by dividing the second detection error +22 of the falling position of the position detection signal Lw by the second average value 1142 as the second correction coefficient, respectively.

That is, the correction coefficient calculation part 67 calculates the first correction coefficient by dividing the first detection error by the average value or the second correction coefficient by dividing the second detection error by the average value.

The memory control part 68 causes the storage part 69 to store the calculated correction coefficient.

That is, the memory control part 68 causes the storage part 69 to store the correction coefficient calculated from one of the first detection error and the second detection error as the correction coefficient for each Hall stage based on whether the calculated first correction coefficient and second correction coefficient include negative values.

Further, as described in step S50, when both the calculated first detection error and second detection error include a negative value, the memory control part 68 causes the storage part 69 to store the correction coefficient calculated from the first detection error or the second detection error that has the smaller absolute value of the negative value.

Further, as described in step S60, when one of the calculated first detection error and the second detection error does not include a negative value, the memory control part 68 causes the storage part 69 to store the correction coefficient calculated from the first detection error or the second detection error that does not include a negative value.

In this way, the storage part 69 stores the correction coefficient obtained by calculating the correction coefficients before shipment of the motor control device.

In this way, with the value obtained by multiplying each counter value of the previous Hall stage by a preset correction coefficient as the delay time of each Hall edge this time, the switching control part 62 generates a PWM command signal having a period of 60 electrical degrees based on each of the Hall edges corrected by the delay time, causes the gate control voltage output part 61 to output the PWM signal having a period of 60 electrical degrees, and controls forward and reverse drive of the motor 2.

According to the motor control device of this embodiment configured as described above, since the position detection signal may be corrected for each Hall edge indicating the switching of the Hall stage, the occurrence of vibration and abnormal noise may be suppressed with high accuracy.

Here, in order to further reduce the size of the motor device 100 or to reduce the influence of the magnetic field from the external environment, there are cases where the Hall sensors are designed to be relatively close to the sensor magnet 22b. In such a case, the disposition interval between the three Hall sensors (23u, 23v, and 23w) disposed in a row on the substrate may become narrower (that is, the Hall sensor pitch may become narrower). In such a case, variations in the magnetization of the sensor magnet and variations in the mounting position of the Hall sensors have a relatively large effect on the error in the time interval (that is, the count value) between the Hall edges. Therefore, when the Hall sensor pitch is narrowed, the correction value for correcting the count value is likely to be negative when the rotation direction of the rotor is used as a reference, depending on the magnetization variation of the sensor magnet and the mounting position variation of the Hall sensor.

When the rotation direction of the rotor is used as a reference, that the correction value (that is, the elapsed time) is a negative value means that the time axis is retroactively corrected. Therefore, if the correction value becomes a negative value, the correction cannot be realized.

Therefore, the motor control device of this embodiment determines whether the correction value (that is, the detection error) is a negative value, and sets the correction coefficient so that the correction value does not become negative. According to the motor control device of this embodiment configured in this manner, the position detection signal may be corrected even when the hall sensor pitch is narrowed, thereby suppressing the occurrence of vibration and abnormal noise with high accuracy.

Further, since the size of the motor control device of this embodiment may be reduced as described above, it may be manufactured at low cost, and the amount of materials required for manufacturing and the amount of waste may be reduced. Therefore, according to the motor control device of this embodiment, Goal 7 of the Sustainable Development Goals (SDGs) led by the United Nations, to "ensure access to affordable, reliable, sustainable and modern energy for all" and Goal 12, to "ensure sustainable consumption and production patterns," may be achieved.

In the above-described embodiment, the case where the control part 6 includes the counter value acquisition part 63, the reference phase selection part 64, the average value calculation part 65, the detection error calculation part 66, the correction coefficient calculation part 67, the memory control part 68, and the storage part 69 has been described as an example, but the disclosure is not limited thereto. The counter value acquisition part 63, the reference phase selection part 64, the average value calculation part 65, the detection error calculation part 66, the correction coefficient calculation part 67, the memory control part 68, and the storage part 69 may be provided in another device included in the motor device 100 or in a device such as a test device outside the motor device 100.

At least a part of the functions of the control part 6 may be implemented by hardware including circuitry such as a large scale integration (LSI), an application specific integrated circuit (ASIC), a field-programmable gate array (FPGA), a graphics processing unit (GPU) and the like. Alternatively, at least a part of the functions of the motor control device may be implemented by cooperation of software and hardware. In addition, these pieces of hardware may be integrated into one, or may be divided into multiple pieces.

The embodiments of the disclosure have been described above with reference to the drawings. However, the motor control device and motor control method are not limited to the above-described embodiments, and at least one of various modifications, replacements, combinations, and design changes may be made without departing from the scope of the disclosure.

Moreover, the effects of the embodiments of the disclosure described above are the effects described as an example. Therefore, the embodiments of the disclosure may have other effects that may be recognized by those skilled in the art from the above description of the embodiments, in addition to the effects described above.

What is claimed is:

1. A motor control device that controls rotation of a rotor by controlling energization of three-phase coils of a brushless motor, the motor control device comprising:
   a plurality of switching elements disposed to be able to switch currents flowing through the coils;

a plurality of sensors provided corresponding to each of the coils for detecting a rotation position of the rotor; and a control part that outputs a drive signal for switching the switching elements based on position detection signals that are outputs of the sensors, wherein the control part comprises:

a gate control voltage output part that outputs a drive signal for switching the switching elements based on a corrected Hall edge forming each of six Hall stages represented by a combination of potentials of the position detection signals that are the outputs of the sensors;

a counter value acquisition part that acquires a counter value, which is a time of the Hall stage represented by a time between two hall edges that form each of the Hall stages, from the position detection signal; and a switching control part that causes the gate control voltage output part to output the drive signal based on each of the Hall edges corrected by a delay time, with a value obtained by calculating each counter value of a previous Hall stage and a preset correction coefficient as the delay time of each Hall edge this time, wherein, with a Hall edge whose corresponding Hall stage has a smaller counter value by widening the Hall edge in a rotation direction of the brushless motor defined as a first reference Hall edge, of two Hall edges that form a first Hall stage, which is a minimum counter value among six Hall stage counter values acquired by the counter value acquisition part, and with the position detection signal corresponding to a phase with the first reference Hall edge defined as a first reference position detection signal, and with a Hall edge whose corresponding Hall stage has a smaller counter value by widening the Hall edge in the rotation direction of the brushless motor defined as a second reference Hall edge, of two Hall edges that form a second Hall stage, which is an intermediate value between a maximum counter value and the minimum counter value among the six Hall stage counter values acquired by the counter value acquisition part, and with the position detection signal corresponding to a phase with the second reference Hall edge defined as a second reference position detection signal, for a first detection error when the first reference position detection signal is used as a reference and a second detection error when the second reference position detection signal is used as a reference, among detection errors, which are differences between an average value of counter values for three Hall stages consecutive in the rotation direction of the brushless motor and the counter values of the respective Hall stages, the correction coefficient calculated from one of the first detection error and the second detection error is selected and set based on whether the first detection error and the second detection error include a negative value.

2. The motor control device according to claim 1, wherein the control part comprises:

a reference phase selection part that selects the first reference position detection signal and the second reference position detection signal from the position detection signals;

an average value calculation part that calculates the average value;

a detection error calculation part that calculates the first detection error and the second detection error;

a correction coefficient calculation part that calculates a first correction coefficient by dividing the first detection error by the average value and a second correction coefficient by dividing the second detection error by the average value; and a memory control part that stores one of the first correction coefficient and the second correction coefficient as the correction coefficient for each of the Hall stages based on whether the calculated first detection error and second detection error include a negative value.

3. The motor control device according to claim 2, wherein when one of the calculated first detection error and second detection error does not include a negative value, the memory control part causes to store the correction coefficient calculated from the first detection error or the second detection error that does not include a negative value.

4. The motor control device according to claim 3, wherein when both the calculated first detection error and second detection error include a negative value, the memory control part causes to store the correction coefficient calculated from the first detection error or the second detection error that has a smaller absolute value of the negative value.

5. The motor control device according to claim 4, wherein the control part comprises a storage part that stores the correction coefficient calculated before shipment of the motor control device.

6. The motor control device according to claim 3, wherein the control part comprises a storage part that stores the correction coefficient calculated before shipment of the motor control device.

7. The motor control device according to claim 2, wherein when both the calculated first detection error and second detection error include a negative value, the memory control part causes to store the correction coefficient calculated from the first detection error or the second detection error that has a smaller absolute value of the negative value.

8. The motor control device according to claim 7, wherein the control part comprises a storage part that stores the correction coefficient calculated before shipment of the motor control device.

9. The motor control device according to claim 2, wherein the control part comprises a storage part that stores the correction coefficient calculated before shipment of the motor control device.

10. The motor control device according to claim 1, wherein the control part comprises a storage part that stores the correction coefficient calculated before shipment of the motor control device.

11. A motor control method for a motor control device that controls rotation of a rotor by controlling energization of three-phase coils of a brushless motor, wherein the motor control device comprises:

a plurality of switching elements disposed to be able to switch currents flowing through the coils;

a plurality of sensors provided corresponding to each of the coils for detecting a rotation position of the rotor; and a control part that outputs a drive signal for switching the switching elements based on position detection signals that are outputs of the sensors, wherein the control part comprises a gate control voltage output part, a counter value acquisition part, and a switching control part, wherein the motor control method comprises:

a gate control voltage output step in which the gate control voltage output part outputs a drive signal for switching the switching elements based on a corrected Hall edge forming each of six Hall stages represented by a combination of potentials of the position detection signals that are the outputs of the sensors;

a counter value acquisition step in which the counter value acquisition part acquires a counter value, which is a time of the Hall stage represented by a time between two hall edges that form each of the Hall stages, from the position detection signal; and a switching control step in which the switching control part causes the gate control voltage output part to output the drive signal based on each of the Hall edges corrected by a delay time, with a value obtained by calculating each counter value of a previous Hall stage and a preset correction coefficient as the delay time of each Hall edge this time, wherein, with a Hall edge whose corresponding Hall stage has a smaller counter value by widening the Hall edge in a rotation direction of the brushless motor defined as a first reference Hall edge, of two Hall edges that form a first Hall stage, which is a minimum counter value among six Hall stage counter values acquired by the counter value acquisition part, and with the position detection signal corresponding to a phase with the first reference Hall edge defined as a first reference position detection signal, and with a Hall edge whose corresponding Hall stage has a smaller counter value by widening the Hall edge in the rotation direction of the brushless motor defined as a second reference Hall edge, of two Hall edges that form a second Hall stage, which is an intermediate value between a maximum counter value and the minimum counter value among the six Hall stage counter values acquired by the counter value acquisition part, and with the position detection signal corresponding to a phase with the second reference Hall edge defined as a second reference position detection signal, for a first detection error when the first reference position detection signal is used as a reference and a second detection error when the second reference position detection signal is used as a reference, among detection errors, which are differences between an average value of counter values for three Hall stages consecutive in the rotation direction of the brushless motor and the counter values of the respective Hall stages, the correction coefficient calculated from one of the first detection error and the second detection error is selected and set based on whether the first detection error and the second detection error include a negative value.

\* \* \* \* \*